United States Patent [19]

Ceccano

[11] 4,137,792
[45] Feb. 6, 1979

[54] TRANSMISSION CONTROLS

[75] Inventor: Lidano Ceccano, Latina, Italy

[73] Assignee: Massey-Ferguson Services N.V., Curacoa, Netherlands Antilles

[21] Appl. No.: 842,442

[22] Filed: Oct. 14, 1977

[30] Foreign Application Priority Data

Oct. 16, 1976 [GB] United Kingdom ............... 43058/76

[51] Int. Cl.² .......................... G05G 9/16; G05G 5/04
[52] U.S. Cl. .................................... 74/473 R; 74/476; 74/526
[58] Field of Search ...................... 74/473 R, 476, 526

[56] References Cited

U.S. PATENT DOCUMENTS

| 1,788,899 | 1/1931 | Tenney | 74/473 R |
| 3,242,758 | 3/1966 | Harris et al. | 74/476 |
| 3,626,780 | 12/1971 | Lowder et al. | 74/526 X |
| 3,779,614 | 12/1973 | Hughes | 74/476 X |
| 3,795,157 | 3/1974 | Campbell et al. | 74/473 R X |

Primary Examiner—Allan D. Herrmann
Attorney, Agent, or Firm—William R. Nolte

[57] ABSTRACT

A control assembly for a vehicle transmission comprising a control member pivotable about a first axis between at least two discrete positions for selecting different drive speeds of the transmission and about a second axis between two outer positions and an intermediate position for selecting forward, reverse and neutral drive conditions respectively. The assembly includes a movable barrier operable when the control member is a first of the discrete positions (to select the lowest drive speed) to permit pivotting about the second axis between the outer positions (to allow a change between the forward and reverse drive conditions) via the intermediate position and operable when the control member is in a second of the discrete positions (to select a higher drive speed) to prevent pivotting about the second axis between the outer positions (to prevent a change between the forward and reverse drive conditions) but allow pivotting about the second axis between either outer position and the intermediate position (to allow a change to the neutral drive condition) depending on the pivotal position of the control member about the second axis.

7 Claims, 6 Drawing Figures

TRANSMISSION CONTROLS

BACKGROUND OF THE INVENTION

This invention relates to control assemblies and more particularly to control assemblies for transmissions.

Transmissions are well known in which ratio and direction changes are made by selective energisation of hydraulic clutches which are controlled by one or more hydraulic valves. It is also well known to provide a single control lever which operates on the valve(s) so that movement in a first plane selects forward or reverse direction and in a second plane selects ratio. A neutral condition is provided between forward and reverse. However, with such arrangements it is possible to move immediately from maximum forward speed to maximum reverse speed so that high loads are placed on the transmission. To prevent this, controls have been provided with a gate in the form of a U shaped slot so that movement from forward to reverse requires a ratio change to reduce vehicle speed. However, this arrangement is unsatisfactory from a safety point of view since a neutral ratio is only available by a compound movement in two planes and such movement may easily re-engage a ratio rather than neutral.

To overcome this an additional position has been made available in the second plane which gives a neutral condition. This not only requires more expensive control valves but means that for each direction change, a ratio and a direction clutch has to be engaged which results in an increased cycle time.

It is an object of the present invention to provide an improved form of control assembly which obviates or mitigates the above disadvantages.

SUMMARY OF THE INVENTION

According to a first aspect of the present invention we provide a control assembly comprising a control member pivotable about a first axis between at least two discrete positions and about a second axis between an intermediate position, and a movable barrier operable when the control member is in a first of the discrete positions to permit pivoting about the second axis between the outer positions via the intermediate position and when the control member is in a second of the discrete positions to prevent pivoting about the second axis between the outer positions but allow pivoting about the second axis between either outer position and the intermediate position depending on the pivotal position of the control member about the second axis.

It will be appreciated that the control assembly of the preceding paragraph can be used, for example, to control a vehicle transmission.

Thus in accordance with the second aspect of the invention we provide a vehicle transmission with forward, neutral and reverse drive conditions and a plurality of drive speeds engageable in the forward and reverse drive conditions, and a control assembly according to the first aspect of the invention for controlling the transmission, the outer positions of the control member being arranged to select forward and reverse drive conditions respectively, the intermediate position being arranged to select neutral, and the discrete positions being arranged to select the plurality of drive speeds, said first discrete position being arranged to select the lowest drive speed of the transmission.

When the control assembly of the invention is used in this manner it will be seen that direction changes in the transmission can only be made with the transmission in the lowest drive speed but the neutral drive condition can be engaged with the transmission in any drive speed simply by pivotting the control member about the second axis. This thus provides a safe arrangement in which it is not possible to move immediately from maximum forward drive speed to maximum reverse drive speed.

In the control assembly of the first aspect of the invention the barrier may comprise a component which extends substantially parallel to the second axis and is pivotable, as a result of movement of the control member, about an axis substantially parallel to its direction of extension to occupy a position preventing the control member from pivotting about the second axis from one outer position to the other when in said second discrete position.

In a preferred arrangement the control member is mounted on a pivotable block for pivotting relative thereto about the first axis, the pivotable block is pivotted on a base block for pivotting relative thereto about the second axis, and the barrier is movably mounted on the base block.

The barrier preferably comprises a pin which extends parallel to the second axis and is mounted at one end on an arm which is pivotable about an axis substantially parallel to the direction of extension of the pin, the arm being mounted for pivotting in a cut-out in the base block, the dimensions of the cut-out determining the extent to which the pin can pivot relative to the base block.

The control member may be provided with a first actuating arm arranged to be connected with a first control linkage and the pivotable block may be provided with a second actuating arm arranged to be connected with a second control linkage. When the control assembly is used in the control of a vehicle transmission, as in the second aspect of the invention, the first control linkage could be arranged to select the operative drive speed and the second control linkage the operative drive condition.

BRIEF DESCRIPTION OF THE DRAWINGS

An embodiment of the present invention will now be described, by way of example only, with reference to the accompanying drawings in which.

DESCRIPTION OF A PREFERRED EMBODIMENT

Figure 1:
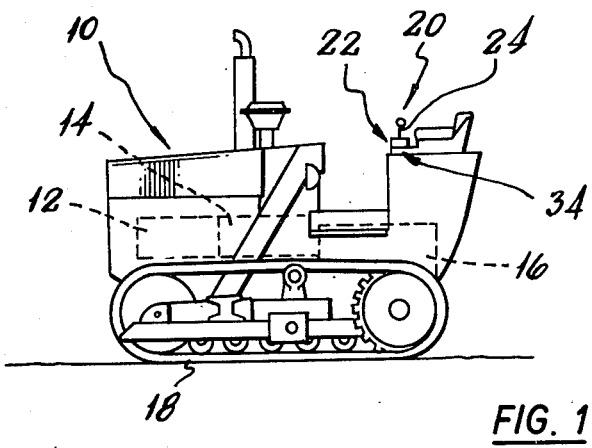
FIG. 1 is a side view of a crawler vehicle.

Referring now to the drawings, a crawler vehicle 10 has an engine 12, a transmission 14 and a final drive assembly 16 which transmits power to the tracks 18. An operators station 20 has a control assembly 22 for regulating the transmission 14.

Figure 2:
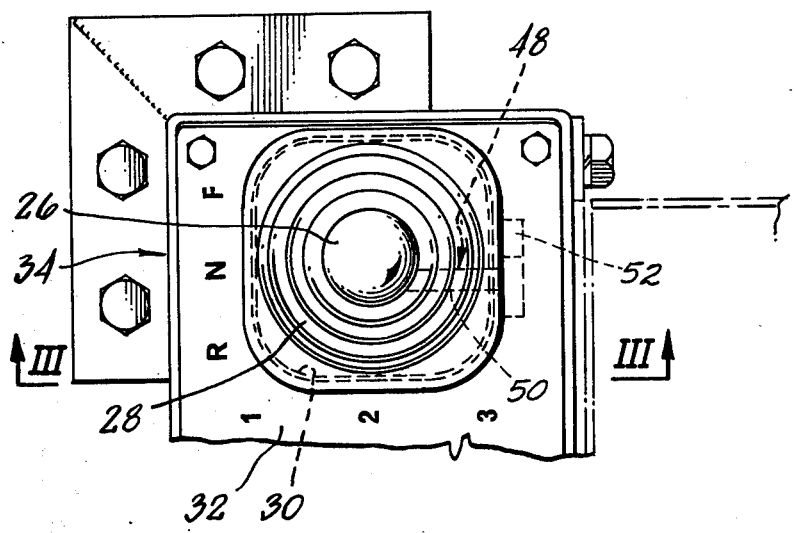
FIG. 2 is a plan view of a portion of the operator station of the crawler vehicle of FIG. 1.

As can best be seen in FIG. 2, the control assembly 22 includes a control member in the form of a lever 24 (FIG. 1) surmounted by a knob 26 and surrounded by a flexible gaiter 28. The gaiter 28 seals an aperture 30 in a plate 32 which forms part of a control stand 34.

The letters "R" "N" "F" are inscribed on the plate 32 along one edge of the aperture 30 and the numerals "1" "2" "3" along an adjacent edge.

Figure 3:
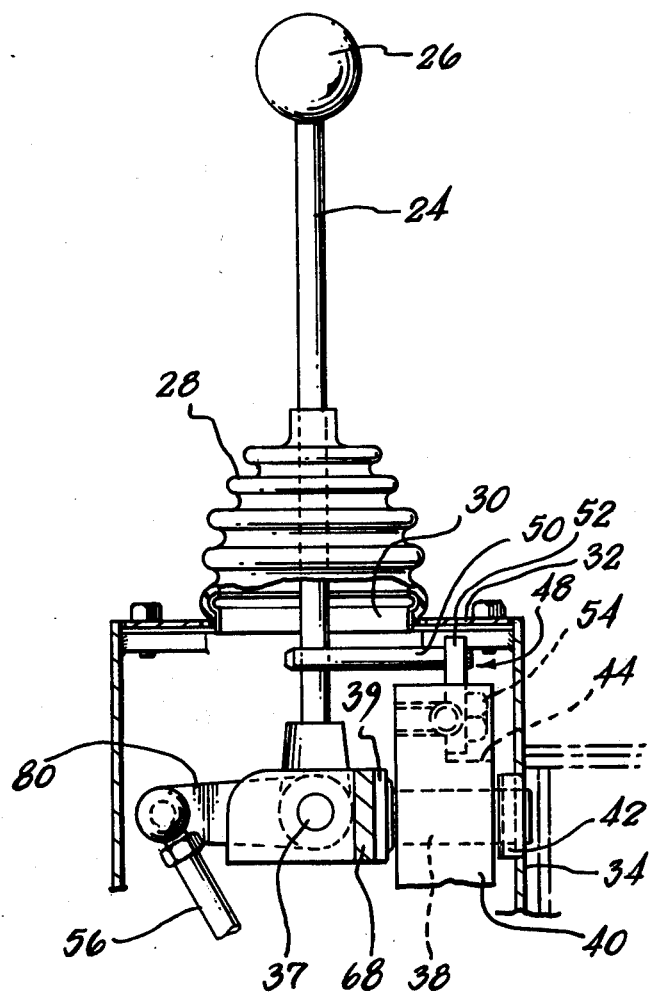
FIG. 3 is a view on the line III — III of FIG. 2.
Figure 4:
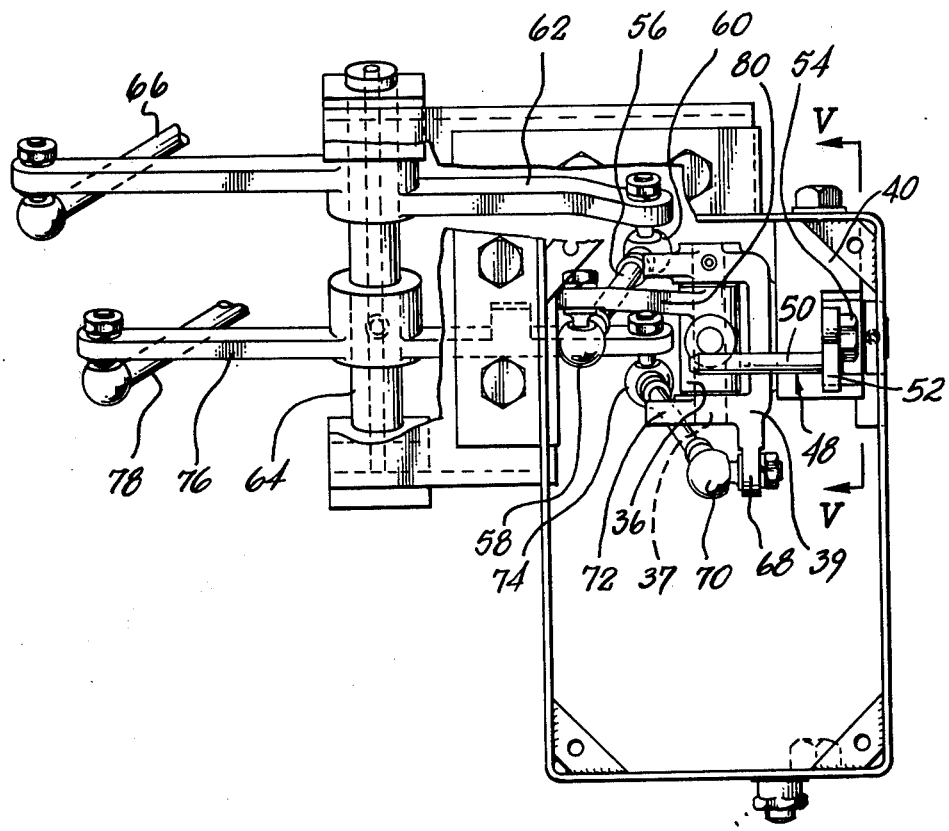
FIG. 4 is a view on the line IV — IV of FIG. 3.

Referring now to FIG. 3, the lever 24 passes through the aperture 30 and is rigidly connected to a support member 36. The member 36 is carried on a pin 37 which is supported by arms of a pivotable clevis block 39 thus providing a first pivot axis for the lever 24. A cylindrical protrusion 38 pivotally supports the clevis block 39 in a base block 40 thus providing a second pivot axis for the lever 24. A collar 42 locates the block 39 to the block 40 which is itself rigidly connected to the support stand 34.

A V-shaped cut-out or notch 44 is formed in the upper surface 46 of the block 40.

An L-shaped barrier 48 formed from a pin 50 welded to an arm in the form of a plate 52 is pivotally mounted within the notch 44 by a bolt 54 so that the pin 50 extends partially across the aperture 30. The barrier 48 can thus pivot about an axis parallel to the second pivot axis of the lever 24.

The support member 36 has an arm 80, extending forwardly which is connected to a link 56 by means of a ball joint 58 arranged on the axis of the projection 38. The other end of the link 56 is connected by a ball joint 60 to a relay lever 62 pivotally mounted intermediate its end on a pivot bar 64. The end of the relay lever 62 is connected to a link 66 which controls a valve selecting ratio in the transmission 14.

The clevis block 39 has an arm 68 which extends from the block 39 in a direction mutually perpendicular to the arm 80. A ball joint 70, arranged on the axis of the pin 37, connects the arm 68 to a link 72. The link 72 is connected by a ball joint 74 to a second relay lever 76 pivoted on the bar 64 and connected by a link 78 to a direction control valve of the transmission 14.

The operation of the control is as follows. Movement of the lever 24 in a direction parallel with the figures "1" "2" "3" causes rotation of the support 36 about the first pivot axis provided by the pin 37. The arm 80 thus translates and causes movement of the lever 62 to select first, second or third gear according to the position of the lever 24.

Movement of the lever 24 parallel to the letters "R" "N" "F" causes the pivotable block 39 to pivot with the projection 38 about the second pivot axis relative to the block 40. The arm 68 is thus translated and actuates the relay lever 76 through the link 72. Movement of the lever 76 actuates a control valve through the link 78 to select forward, neutral or reverse direction depending on the position of the lever 24. The movement of the lever 24 in this mode does not affect the relay lever 62 since the axis of rotation of the block 36 corresponds to the axis of rotation of the ball joint 58.

It can be seen that the support arrangement of the lever 24 permits universal movement. The lever 24 is prevented in accordance with the invention from moving between third ratio forward and third ratio reverse by the barrier 48.

The pin 50 of the barrier extends across the aperture 30 only as far as the "2" so that movement of the lever 24 between "1F" and "1R" positions is not affected by the barrier 48.

The barrier thus only affects the movement of the lever 24 when the lever is in its "2" and "3" positions.

Figure 5A:
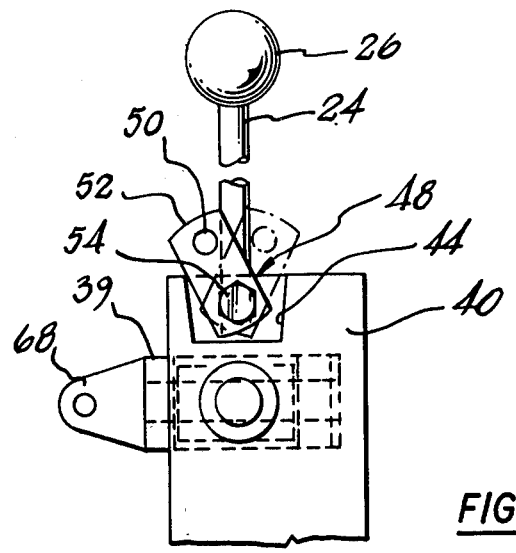
FIG. 5a is a view on the line V — V of FIG. 4.
Figure 5B:
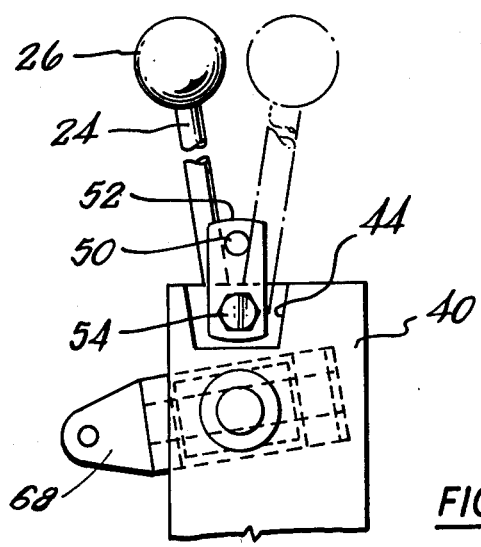
FIG. 5b is a view similar to FIG. 5a showing an alternative position of the components.

As can best be seen from FIG. 5a the barrier 48 may occupy two extreme or outer positions in which movement of the lever 24 into one of the direction positions is prohibited when the lever is in its "2" or "3" position. As can be seen from FIG. 5b, when the lever 24 occupies a direction position (i.e. aligned with either the "F" or "R") it may be moved to a neutral position but further movement into the other direction position is prevented by the barrier 48.

Thus in the arrangement described above direction changes can only occur in first ratio position. The tapered end of the pin 50 facilitates movement of the lever 24 from "1" to "2" after a direction change. Neutral can be engaged directly from either direction position and any speed position.

I claim:

1. A control assembly comprising a control member pivotable about a first axis between at least two discrete positions and about a second axis between two outer positions and an intermediate position, and a movable barrier operable when the control member in a first of the discrete positions to permit pivoting about the second axis between the outer positions via the intermediate position and operable when the control member is in a second of the discrete positions to prevent pivoting about the second axis between the outer positions but allow pivoting about the second axis between either outer position and the intermediate position depending on the pivotal position of the control member about the second axis.

2. An assembly according to claim 1 in which the barrier comprises a component which extends substantially parallel to the second axis and is pivotable, as a result of movement of the control member, about an axis substantially parallel to its direction of extension to occupy a position preventing the control member from pivoting about the second axis from one outer position to the other when in said second discrete position.

3. An assembly according to claim 1 in which the control member is mounted on a pivotable block for pivoting relative thereto about the first axis, the pivotable block is pivoted on a base block for pivoting relative thereto about the second axis, and the barrier is movably mounted on the base block.

4. An assembly according to claim 3 in which the barrier comprises a pin which extends parallel to the second axis and is mounted at one end on an arm which is pivotable about an axis substantially parallel to the direction of extension of the pin, the arm being mounted for pivoting in a cut-out in the base block, the dimensions of the cut-out determining the extent to which the pin can pivot relative to the base block.

5. An assembly according to claim 3 in which the control member is provided with a first actuating arm arranged to be connected with a first control linkage and the pivotable block is provided with a second actuating arm arranged to be connected with a second control linkage.

6. An assembly according to claim 2 in which the control member has at least three discrete positions and the barrier extends parallel to the second axis for a distance sufficient to prevent pivotting of the control member about the second axis between the outer positions with the control lever in more than one discrete position.

7. A vehicle transmission having forward, neutral and reverse drive conditions and a plurality of drive speeds engageable in the forward and reverse drive conditions, and a control assembly according to claim 1 for controlling the transmission, the outer positions of the control member being arranged to select forward and reverse drive conditions respectively, the intermediate position being arranged to select neutral, and the discrete positions being arranged to select the plurality of drive speeds, said first discrete position being arranged to select the lowest drive speed of the transmission.

* * * * *